(12) United States Patent
Kodera (10) Patent No.: US 10,384,711 B2
(45) Date of Patent: Aug. 20, 2019

(54) STEERING CONTROLLER

(71) Applicant: JTEKT CORPORATION, Osaka-shi, Osaka (JP)

(72) Inventor: Takashi Kodera, Okazaki (JP)

(73) Assignee: JTEKT CORPORATION, Osaka-shi (JP)

( * ) Notice: Subject to any disclaimer, the term of this patent is extended or adjusted under 35 U.S.C. 154(b) by 104 days.

(21) Appl. No.: 15/703,047

(22) Filed: Sep. 13, 2017

(65) Prior Publication Data

US 2018/0086366 A1    Mar. 29, 2018

(30) Foreign Application Priority Data

Sep. 27, 2016    (JP) .................................. 2016-188193

(51) Int. Cl.
*B62D 5/00*    (2006.01)
*B62D 5/04*    (2006.01)

(52) U.S. Cl.
CPC ........... *B62D 5/0478* (2013.01); *B62D 5/003* (2013.01); *B62D 5/043* (2013.01); *B62D 5/0409* (2013.01); *B62D 5/0421* (2013.01); *B62D 5/0442* (2013.01)

(58) Field of Classification Search
None
See application file for complete search history.

(56) References Cited

U.S. PATENT DOCUMENTS

| | | | | |
|---|---|---|---|---|
| 6,876,994 B2 * | 4/2005 | Ishikawa | .......... | H04N 21/23106 |
| 7,106,012 B2 * | 9/2006 | Matsuda | ................ | B62D 5/008 |
| | | | | 180/443 |
| 7,890,233 B2 * | 2/2011 | Yamada | ............... | G06F 11/1679 |
| | | | | 701/45 |
| 8,275,504 B2 * | 9/2012 | Chen | ................... | B60L 11/1861 |
| | | | | 701/1 |
| 8,350,510 B2 * | 1/2013 | Ogasawara | ........... | H02M 3/158 |
| | | | | 180/443 |
| 2005/0038585 A1 * | 2/2005 | Asaumi | ................ | B62D 5/0463 |
| | | | | 701/43 |
| 2005/0258792 A1 * | 11/2005 | Matsuda | ................ | B62D 5/008 |
| | | | | 318/432 |

(Continued)

FOREIGN PATENT DOCUMENTS

JP    2005-029002 A    2/2005

OTHER PUBLICATIONS

Jan. 24, 2018 Search Report issued in European Patent Application No. 17192090.3.

*Primary Examiner* — Truc M Do
(74) *Attorney, Agent, or Firm* — Oliff PLC (57) ABSTRACT

Provided is a steering controller configured to suppress deterioration of the operability of a steering wheel for steering steered wheels even when a driving voltage for a steering system has been decreased. When a clutch is in a disengaged state and steered wheels are steered by a steered-operation actuator while a reaction force is applied to steering wheel by a reaction-force actuator, if a driving voltage for the steered-operation actuator is decreased, a CPU opens relays and stops generation of torque by the steered-operation actuator. Meanwhile, a CPU engages the clutch and steers the steered wheels through cooperation between a steering torque input into the steering wheel and an assist torque generated by a reaction-force motor.

8 Claims, 5 Drawing Sheets

(56) References Cited

U.S. PATENT DOCUMENTS

| | | | |
|---|---|---|---|
| 2006/0181819 A1* | 8/2006 | Nomura | B62D 5/0487 361/31 |
| 2006/0190151 A1* | 8/2006 | Tsutsumi | B62D 5/003 701/41 |
| 2007/0116135 A1* | 5/2007 | Tsuchida | B62D 5/046 375/259 |
| 2008/0156572 A1* | 7/2008 | Kasahara | B62D 5/003 180/402 |
| 2011/0098889 A1* | 4/2011 | Oya | B62D 5/0457 701/41 |
| 2011/0115289 A1* | 5/2011 | Kitamoto | B62D 5/0484 307/10.1 |

* cited by examiner

STEERING CONTROLLER

INCORPORATION BY REFERENCE

The disclosure of Japanese Patent Application No. 2016-188193 filed on Sep. 27, 2016 including the specification, drawings and abstract, is incorporated herein by reference in its entirety.

BACKGROUND OF THE INVENTION

1. Field of the Invention

The invention relates to a steering controller configured to control a steering system including: a switching device configured to perform switching between a transmission state where power transmission from a steering wheel to steered wheels is allowed and an interruption state where power transmission from the steering wheel to the steered wheels is interrupted; a reaction-force actuator configured to apply a steering reaction force to the steering wheel in the interruption state; and a steered-operation actuator configured to steer the steered wheels.

2. Description of Related Art

For example, Japanese Patent Application Publication No. 2005-29002 (JP 2005-29002 A) describes a controller for a steer-by-wire system in which a reaction force is applied by a reaction-force actuator to a steering wheel in an interruption state where power transmission from the steering wheel to steered wheels is interrupted. The controller includes a microcomputer, and the microcomputer generates an operation signal for a steered-operation actuator. In particular, the controller includes a booster circuit configured to boost a voltage supplied from a battery and a regulator configured to step down a voltage output from the booster circuit, and the voltage output from the regulator is used as a power supply voltage of the microcomputer. When the voltage supplied from the battery has been decreased, the booster circuit boosts the voltage supplied from the battery in order to extend the period during which the microcomputer operates normally.

In a case where a driving voltage for the steered-operation actuator or the reaction-force actuator has been decreased, even when an operation signal is input into a steering system from the microcomputer, the steering system may fail to appropriately execute a process of steering the steered wheels. In this case, the steered wheels may fail to follow an operation of the steering wheel, and the operability of the steering wheel configured to steer the steered wheels may deteriorate. For example, in a case where a switching device that interrupts power transmission between the steered wheels and the steering wheel is configured to be placed in an interruption state upon energization and a driving voltage for the switching device has been decreased, a transmission state where power transmission between the steering wheel and the steered wheels is allowed may be unintentionally achieved, so that the operability of the steering wheel, which is operated by a user to steer the steered wheels, may deteriorate.

SUMMARY OF THE INVENTION

One object of the invention is to provide a steering controller configured to suppress deterioration of the operability of a steering wheel for steering steered wheels even when a driving voltage for a steering system has been decreased.

An aspect of the invention relates to a steering controller configured to control a steering system including a switching device configured to perform switching between a transmission state where power transmission from a steering wheel to steered wheels is allowed and an interruption state where power transmission from the steering wheel to the steered wheels is interrupted, a reaction-force actuator configured to apply a steering reaction force to the steering wheel in the interruption state, and a steered operation actuator configured to steer the steered wheels. The steering controller includes: a memory configured to store software for controlling the steering system; and a hardware device configured to control the steering system by executing the software. The switching device is placed in the interruption state upon energization, and is placed in the transmission state when entering a de-energized state. The steering controller executes: a voltage acquisition process of acquiring any one of a driving voltage for the reaction-force actuator, a driving voltage for the steered-operation actuator, and a driving voltage for the switching device when the switching device is in the interruption state; and a transmission operation process of placing the switching device in the transmission state when a voltage acquired through the voltage acquisition process is equal to or lower than a threshold voltage.

In the foregoing configuration, for example, when a voltage for the reaction-force actuator is acquired through the voltage acquisition process and the voltage is equal to or lower than the threshold voltage, a sufficient reaction force cannot be applied to the steering wheel by the reaction-force actuator, and the steering wheel may be excessively largely turned with a considerably small torque. In contrast to this, by placing the switching device in the transmission state through the transmission operation process, a reaction force from the steered wheel-side can be applied to the steering wheel, and thus the steering wheel is suppressed from excessively largely turning with a very small torque. In addition, for example, when a voltage for the steered-operation actuator is acquired through the voltage acquisition process and the voltage is equal to or lower than the threshold voltage, a sufficient torque cannot be applied to the steering wheel by the steered-operation actuator, so that it may be difficult to steer the steered wheels in response to an operation of the steering wheel. In contrast to this, by placing the switching device in the transmission state through the transmission operation process, a torque input into the steering wheel can be transmitted to the steered wheels. In addition, for example, when a driving voltage for the switching device is acquired through the voltage acquisition process and the voltage is equal to or lower than the threshold voltage, by switching the switching device to the transmission state through the transmission operation process, the transmission state where power is transmitted between the steered wheels and the steering wheel is suppressed from being unintentionally achieved during control that is executed on the assumption that power transmission between the steering wheel and the steered wheels is interrupted. Thus, even when a driving voltage for the steering system has been decreased, deterioration of the operability of the steering wheel for steering the steered wheels can be suppressed.

BRIEF DESCRIPTION OF THE DRAWINGS

The foregoing and further features and advantages of the invention will become apparent from the following descrip

DETAILED DESCRIPTION OF EMBODIMENTS

Figure 1:
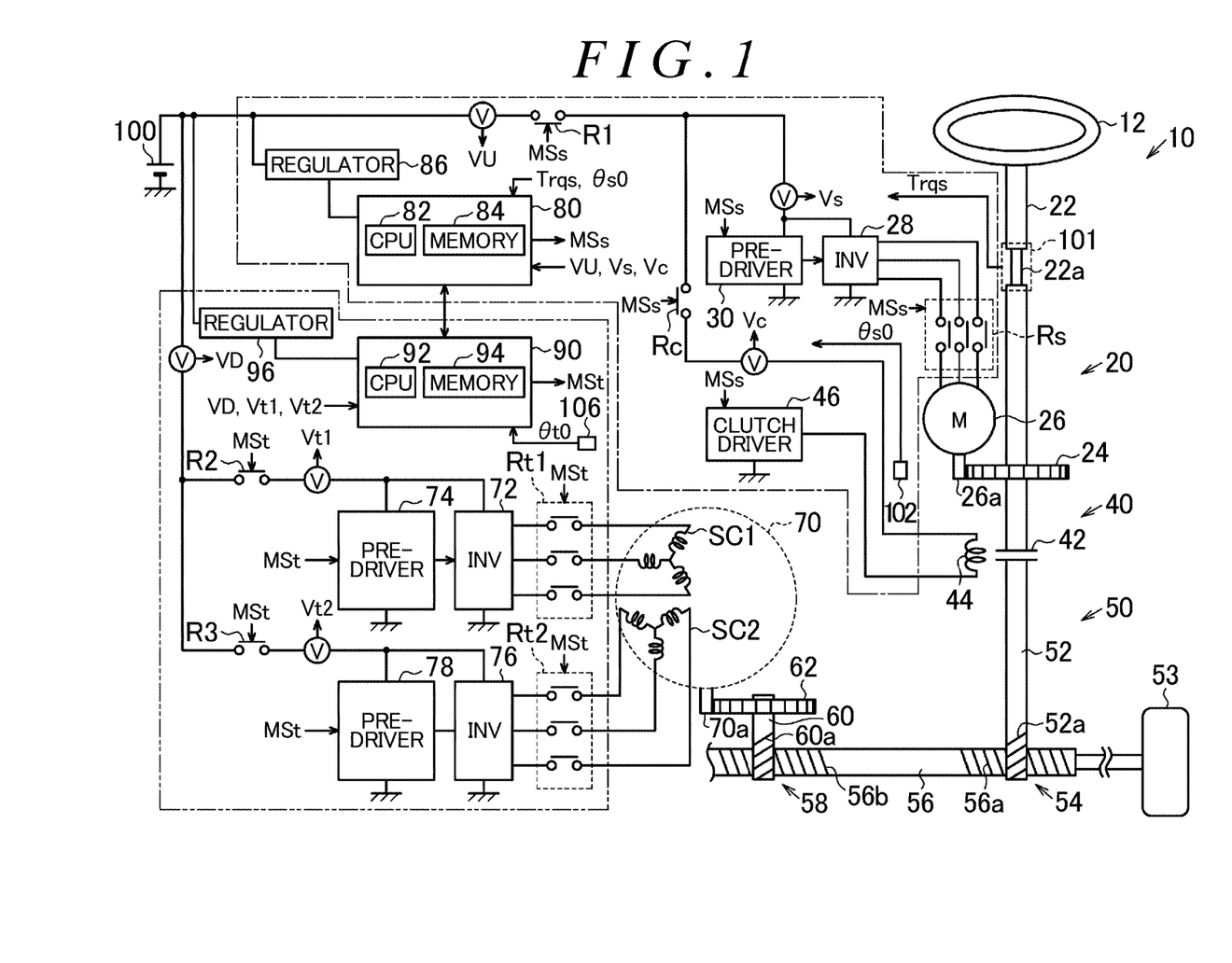
- FIG. 1 is a view illustrating a steering controller according to a first embodiment and an object to be controlled by the steering controller.

Hereinafter, a steering controller according to a first embodiment of the invention will be described with reference to the accompanying drawings. As illustrated in FIG. 1, in a steering system 10 according to the present embodiment, a steering wheel 12 is connected to a reaction-force actuator 20 configured to apply a reaction force that is a force acting against an operation of the steering wheel 12. The reaction-force actuator 20 includes a steering shaft 22 fixed to the steering wheel 12, a reaction-force-side speed reducer 24, a reaction-force motor 26 provided with a rotary shaft 26a coupled to the reaction-force-side speed reducer 24, a relay Rs, an inverter 28 configured to drive the reaction-force motor 26, and a pre-driver 30 configured to drive switching devices of the inverter 28. In the present embodiment, a surface permanent magnet synchronous motor (SPMSM) is used as the reaction-force motor 26. The reaction-force motor 26 is connected to the inverter 28 via the relay Rs. Electric power is supplied from a battery 100 to the inverter 28 and the pre-driver 30 via a power supply relay R1.

The steering shaft 22 can be connected to a pinion shaft 52 of a steered-operation actuator 50 via a clutch 42 included in a switching device 40. The switching device 40 includes an electromagnetic coil 44 for disengaging the clutch 42, and a clutch driver 46 configured to control current to be passed through the electromagnetic coil 44, in addition to the clutch 42. A clutch relay Rc connected to the battery 100 is connected to a first terminal of the electromagnetic coil 44, and a second terminal of the electromagnetic coil 44 is connected to the clutch driver 46. The clutch 42 enters a disengaged state upon energization of the electromagnetic coil 44, and enters a transmission state when the electromagnetic coil 44 enters a de-energized state.

The steered-operation actuator 50 includes a first rack-and-pinion mechanism 54, a second rack-and-pinion mechanism 58, a steered-side speed reducer 62, a steered-operation motor 70 provided with a rotary shaft 70a coupled to the steered-side speed reducer 62, inverters 72, 76 configured to drive the steered-operation motor 70, and pre-drivers 74, 78 configured to drive switching devices of the inverters 72, 76.

The first rack-and-pinion mechanism 54 includes a rack shaft 56 and the pinion shaft 52 disposed at a prescribed intersection angle, and first rack teeth 56a provided on the rack shaft 56 and pinion teeth 52a provided on the pinion shaft 52 are meshed with each other. Steered wheels 53 are connected to respective ends of the rack shaft 56 via tie rods.

The second rack-and-pinion mechanism 58 includes the rack shaft 56 and a pinion shaft 60 disposed with a prescribed intersection angle, and second rack teeth 56b provided on the rack shaft 56 and pinion teeth 60a provided on the pinion shaft 60 are meshed with each other.

The pinion shaft 60 is connected to the rotary shaft 70a of the steered-operation motor 70 via the steered-side speed reducer 62. In the present embodiment, a surface permanent magnet synchronous motor (SPMSM) is used as the steered-operation motor 70. The steered-operation motor 70 includes a first system coil SC1 and a second system coil SC2, each of which is a three-phase stator coil. The first system coil SC1 is connected to the inverter 72 via a relay Rt1, and the second system coil SC2 is connected to the inverter 76 via a relay Rt2. The pre-driver 74 is configured to drive the switching devices of the inverter 72, and the pre-driver 78 is configured to drive the switching devices of the inverter 76. Electric power is supplied from the battery 100 to the inverter 72 and the pre-driver 74 via a power supply relay R2, and electric power is supplied from the battery 100 to the inverter 76 and the pre-driver 78 via a power supply relay R3.

A reaction-force-side microcomputer 80 outputs an operation signal MSs to the inverter 28 via the pre-driver 30 in order to operate the reaction-force actuator 20, outputs an operation signal MSs in order to drive the clutch driver 46, and outputs an operation signal MSs in order to open or close the power supply relay R1, the relay Rs, and the clutch relay Rc. For example, the operation signal MSs for the inverter 28 and the operation signal MSs for the clutch driver 46 are signals different from each other. However, for the sake of convenience, a reference symbol MSs is assigned to each of the operation signals output from the reaction-force-side microcomputer 80. The voltage output from the battery 100 and then stepped down by a regulator 86 is applied to the reaction-force-side microcomputer 80 as a power supply voltage.

The reaction-force-side microcomputer 80A receives a value detected by a torque sensor 101 configured to detect an input torque (a steering torque Trqs) input into the steering wheel 12 based on a torsion amount of a torsion bar 22a provided at an intermediate portion of the steering shaft 22 and a value detected by a rotation angle sensor 102 configured to detect a rotation angle θs0 of the rotary shaft 26a of the reaction-force motor 26. In addition, the reaction-force-side microcomputer 80a receives a value detected by a sensor configured to detect a driving voltage for the reaction-force actuator 20 and the switching device 40. That is, the reaction-force-side microcomputer 80A receives, for example, a voltage VU between the battery 100 and the power supply relay R1, a voltage Vs between the power supply relay R1, and the pre-driver 30 and the inverter 28, a voltage between the clutch relay Rc and the electromagnetic coil 44 (a driving voltage Vc for the switching device 40.

A steered-side microcomputer 90 outputs an operation signal MSt to the inverter 72 via the pre-driver 74 in order to operate the steered-operation actuator 50, outputs an operation signal MSt to the inverter 76 via the pre-driver 78, and outputs an operation signal MSt in order to open or close the power supply relays R2, R3 and the relays Rt1, Rt2. For example, the operation signal MSt for the inverter 72 and the operation signal MSt for the power supply relay R2 are signals different from each other. However, for the sake of convenience, a reference symbol MSt is assigned to each of the operation signals output from the steered-side microcomputer 90. The voltage output from the battery 100 and then stepped down by a regulator 96 is applied to the steered-side microcomputer 90 as a power supply voltage.

The steered-side microcomputer 90A receives a value detected by a rotation angle sensor 106 configured to detect a rotation angle θt0 of the rotary shaft 70a of the steered-operation motor 70. In addition, the steered-side microcomputer 90a receives a value detected by a sensor configured to detect a driving voltage for the steered-operation actuator 50. That is, the steered-side microcomputer 90a receives, for example, a voltage between the battery 100 and the power supply relays R2, R3 (a driving voltage VD for the steered-operation actuator 50). In addition, the steered-side microcomputer 90a receives, for example, a voltage between the power supply relay R2, and the inverter 72 and the pre-driver 74 (a driving voltage Vt1 for the first system coil SC1), and a voltage between the power supply relay R3, and the inverter 76 and the pre-driver 78 (a driving voltage Vt2 for the second system coil SC2). Note that the driving voltage Vt1 for the first system coil SC1 and the driving voltage Vt2 for the second system coil SC2 are each a driving voltage for the steered-operation actuator 50. However, for the sake of description, the driving voltage Vt1 and the driving voltage Vt2 are respectively referred to as the driving voltage Vt1 for the first system coil SC1 and the driving voltage Vt2 for the second system coil SC2.

A portion surrounded by a long dashed short dashed line and a portion surrounded by a long dashed double-short dashed line in FIG. 1 are circuits mounted on circuit boards that are different from each other. That is, in the present embodiment, the reaction-force-side microcomputer 80 and the steered-side microcomputer 90 are mounted on circuit boards that are different from each other.

The reaction-force-side microcomputer 80 includes a central processing unit (CPU) 82 and a memory 84 that stores, for example, programs executed by the CPU 82. The steered-side microcomputer 90 includes a central processing unit (CPU) 92 and a memory 94 that stores, for example, programs executed by the CPU 92.

Figure 2:
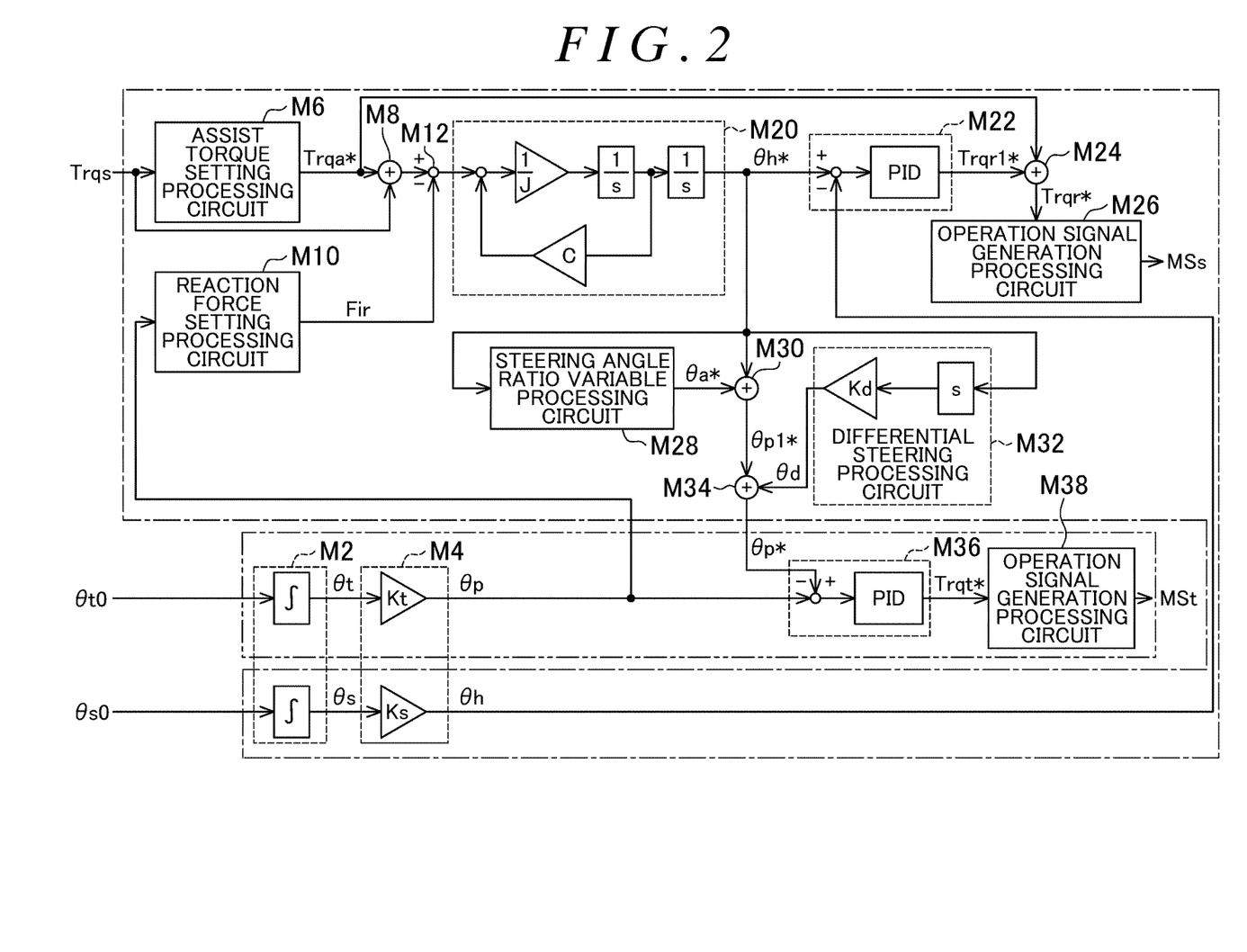
FIG. 2 is a block diagram according to the first embodiment.

FIG. 2 illustrates some of the processes that are executed when at least the clutch 42 is in a disengaged state, from among the processes that are achieved when the CPU 82 executes the programs stored in the memory 84 and the processes that are achieved when the CPU 92 executes the programs stored in the memory 94.

An integration processing circuit M2 converts the rotation angle Θs0 detected by the rotation angle sensor 102 and the rotation angle θt0 detected by the rotation angle sensor 106 into numerical values within an angular range wider than a range of 0 to 360°, thereby obtaining rotation angles θs, θt. Specifically, for example, when the steering wheel 12 is turned maximally to the right or to the left from a neutral position at which the vehicle travels straight forward, the rotary shaft 26a rotates beyond 360°. Therefore, for example, when the rotary shaft 26a rotates twice in a prescribed direction from the state where the steering wheel 12 is at the neutral position, the integration processing circuit M2 sets an output value to 720°. The integration processing circuit M2 sets an output value to zero when the steering wheel 12 is at the neutral position.

A measurement unit setting processing circuit M4 multiplies the output value from the rotation angle sensor 102, which has been subjected to the process by the integration processing circuit M2, by a conversion factor Ks, thereby calculating a steering angle θh, and multiplies the output value from the rotation angle sensor 106, which has been subjected to the process by the integration processing circuit M2, by a conversion factor Kt, thereby calculating a steered angle θp. In this case, the conversion factor Ks is set based on a ratio of rotation speed between the reaction-force-side speed reducer 24 and the rotary shaft 26a of the reaction-force motor 26, and the conversion factor Ks is used to convert an amount of change in the rotation angle θs of the rotary shaft 26a into an amount of turning of the steering wheel 12. Thus, the steering angle θh represents a turning angle of the steering wheel 12 with respect to the neutral position. The conversion factor Kt is a product of a ratio of rotation speed between the steered-side speed reducer 62 and the rotary shaft 70a of the steered-side motor 70 and a ratio of rotation speed between the pinion shaft 60 and the pinion shaft 52. This conversion factor Kt is used to convert an amount of rotation of the rotary shaft 70a into an amount of turning of the steering wheel 12 on the assumption that the clutch 42 is engaged.

In the processes illustrated in FIG. 2, the rotation angles θs, θt, the steering angle θh, and the steered angle θp each take a positive value when the rotation direction is a prescribed direction, whereas the rotation angles θs, θt, the steering angle θh, and the steered angle θp each take a negative value when the rotation direction is a direction opposite to the prescribed direction. Thus, for example, when the rotary shaft 26a rotates in a direction opposite to the prescribed direction from the state where the steering wheel 12 is at the neutral position, the integration processing circuit M2 outputs a negative output value. However, this is merely an example of control system logics. In particular, in this specification, that the rotation angles θs, θt, the steering angle θh, and the steered angle θp are large means that the amount of change from the neutral position is large. In other words, this means that the absolute value of a parameter that takes a positive value or a negative value as described above is large.

An assist torque setting processing circuit M6 sets an assist torque Trqa* based on the steering torque Trqs. The assist torque Trqa* is set to a larger value as the steering torque Trqs is larger. An addition processing circuit M8 adds the steering torque Trqs to the assist torque Trqa* and outputs a resultant value.

A reaction force setting processing circuit M10 sets a reaction force Fir that is a force acting against turning of the steering wheel 12. Specifically, in the present embodiment, the reaction force setting processing circuit M10 receives the steered angle θp as an input, and sets an absolute value of the reaction force Fir to a larger value when the absolute value of the steered angle θp is large than when the absolute value of the steered angle θp is small.

A deviation calculation processing circuit M12 outputs a value obtained by subtracting the reaction force Fir from the value output from the addition processing circuit M8. A steering angle command value calculation processing circuit M20 sets a steering angle command value θh* based on the value output from the deviation calculation processing circuit M12. The steering angle command value calculation processing circuit M20 uses a model equation expressed by Equation (c1) that correlates an output value Δ from the deviation calculation processing circuit M12 with the steering angle command value θh*.

$$\Delta = C \cdot \theta h^{*\prime} + J \cdot \theta h^{*\prime\prime}$$ Equation (c1)

The model expressed by Equation (c1) is a model that defines a relationship between an axial force of the rack shaft 56 and the steering angle θh in a system in which the steering wheel 12 and the steered wheels 53 are mechanically coupled to each other. In the Equation (c1), a viscosity coefficient C is obtained by modeling, for example, friction in the steering system 10, and an inertia coefficient J is obtained by modeling inertia in the steering system 10.

A steering angle feedback processing circuit M22 sets a feedback torque Trqr1* as a manipulated variable that is used to cause the steering angle θh to follow the steering angle command value θh* through feedback control. Specifically, the sum of output values from a proportional element, an integrating element, and a differentiating element based on an input of a value obtained by subtracting the steering angle θh from the steering angle command value θh* is used as the feedback torque Trqr1*.

An addition processing circuit M24 outputs the sum of the feedback torque Trqr1* output from the steering angle feedback processing circuit M22 and the assist torque Trqa* output from the assist torque setting processing circuit M6, as a torque command value (reaction force command value Trqr*) for the reaction-force motor 26.

An operation signal generation processing circuit M26 generates an operation signal MSs for the inverter 28 based on the reaction force command value Trqr*, and outputs the operation signal MSs to the inverter 28. This process can be achieved, for example, through known current feedback control in which a q-axis current command value is set based on the reaction force command value Trqr* and a dq-axis voltage command value is set as a manipulated variable used to cause a dq-axis current to follow a command value through feedback control. The d-axis current may be controlled to be zero. However, when the rotation speed of the reaction-force motor 26 is high, field-weakening control may be executed with the absolute value of the d-axis current set to a value larger than zero. However, the absolute value of the d-axis current may be set to a value larger than zero in a low rotation speed range.

Based on the steering angle command value θh*, a steering angle ratio variable processing circuit M28 sets a target operation angle θa* that is used to variably set a steering angle ratio that is a ratio between the steering angle θh and the steered angle θp. An addition processing circuit M30 calculates a steered angle command value θp* by adding the target operation angle θa* to the steering angle command value θh*.

A differential steering processing circuit M32 outputs a value obtained by multiplying a rate of change in the steering angle command value θh* by a gain Kd, as a steering correction amount θd. A steering correction processing circuit M34 calculates the steered angle command value θp* by adding the steering correction amount θd to the steered angle command value θp1*, and outputs the steered angle command value θp*.

A steered angle feedback processing circuit M36 sets a torque command value (a steered-operation torque command value Trqt*) for the steered-side motor 70, as a manipulated variable used to cause the steered angle θp to follow the steered angle command value θp* through feedback control. Specifically, the sum of output values from a proportional element, an integrating element, and a differentiating element based on an input of a value obtained by subtracting the steered angle θp from the steered angle command value θp* is used as the steered-operation torque command value Trqt*.

An operation signal generation processing circuit M38 generates an operation signal MSt for each of the inverters 72, 76 based on the steered-operation torque command value Trqt*, and outputs the operation signal MSt to each of the inverters 72, 76. This process can be executed in a manner similar to the manner in which the operation signal generation process is executed by the operation signal generation processing circuit M26. The present embodiment is described on the assumption that the same magnitude of current is passed through the first system coil SC1 and the second system coil SC2 at normal times when the clutch 42 is in the disengaged state. In this case, the operation signal MSt for the inverter 72 and the operation signal MSt for the inverter 76 are the same.

A portion surrounded by a long dashed short dashed line in FIG. 2 indicates a process that is executed by the CPU 82 according to a program stored in the memory 84. A portion surrounded by a long dashed double-short dashed line in FIG. 2 indicates a process that is executed by the CPU 92 according to a program stored in the memory 94.

Figure 3:
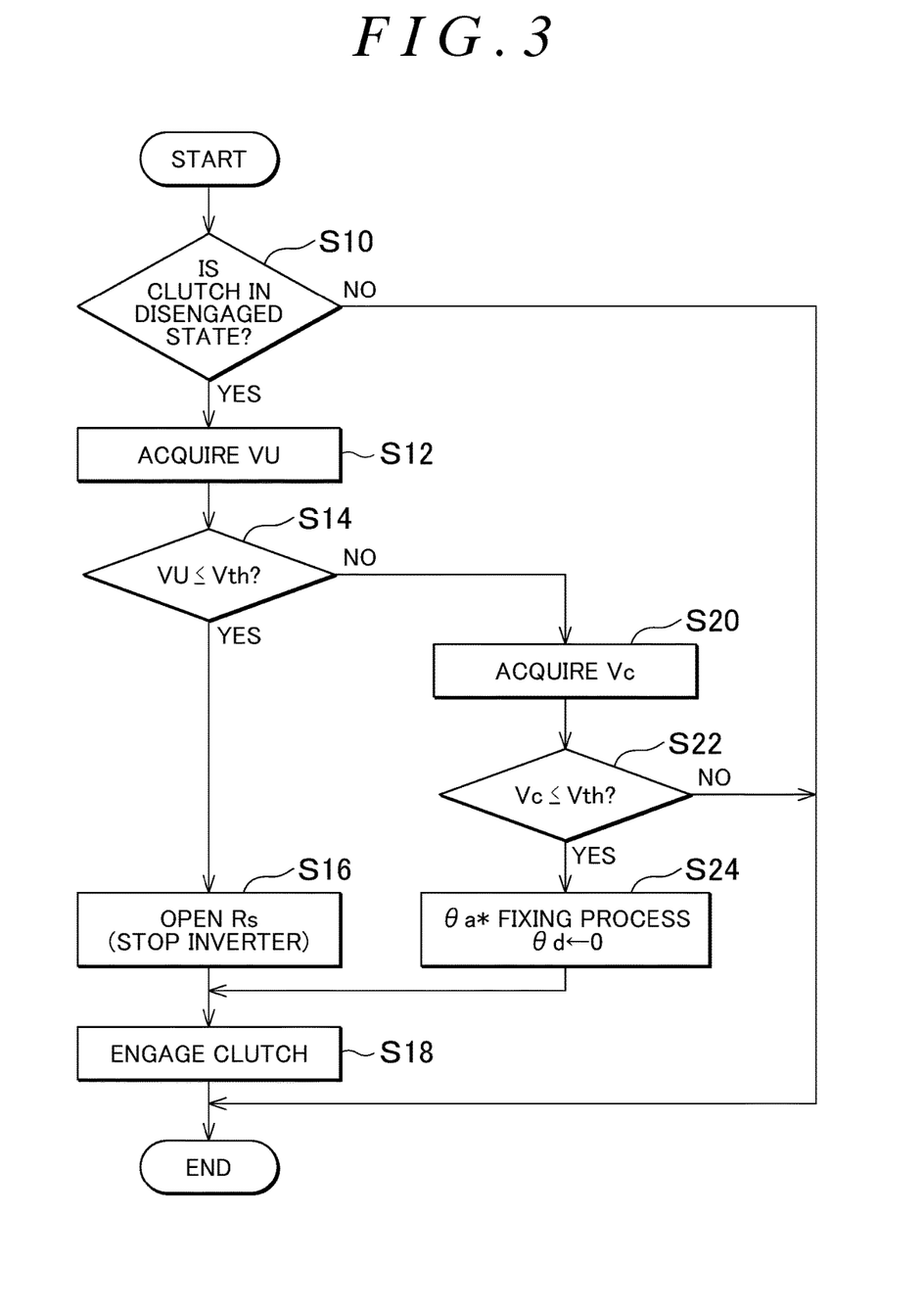
FIG. 3 is a flowchart illustrating the procedures of a process executed by a reaction-force-side microcomputer according to the first embodiment.

Next, description will be provided on a process that is executed upon occurrence of an abnormality in which the voltage supplied to the circuit board, on which the reaction-force-side microcomputer 80 is provided, is decreased. FIG. 3 illustrates the procedures of a process that is executed when an abnormality has occurred in a driving voltage for the reaction-force actuator 20 and the switching device 40. The process illustrated in FIG. 3 is achieved when the CPU 82 repeatedly executes the program stored in the memory 84 at prescribed time intervals. Hereinafter, step numbers will be indicated by providing "S" before numbers.

In the procedures of the process illustrated in FIG. 3, first, the CPU 82 determines whether the clutch 42 is in a disengaged state (S10). When the CPU 82 determines that the clutch 42 is in the disengaged state (S10: YES), the CPU 82 acquires a voltage VU (S12). Then, the CPU 82 determines whether the voltage VU is equal to or lower than a threshold voltage Vth (S14). When the CPU 82 determines that the voltage VU is equal to or lower than the threshold voltage Vth (S14: YES), the CPU 82 determines that an abnormality in which the driving voltage for the reaction-force actuator 20 is decreased has occurred, and stops the inverter 28 by stopping inputting the operation signal MSs into the inverter 28 via the pre-driver 30 while opening the relay Rs (S16). Further, the CPU 82 switches the clutch 42 to the engaged state by placing the electromagnetic coil 44 in a non-conducting state by using the clutch driver 46 (S18).

When the CPU 82 determines that the voltage VU is higher than the threshold voltage Vth (S14: NO), the CPU 82 acquires a driving voltage Vc for the switching device 40 (S20). Then, the CPU 82 determines whether the driving voltage Vc is equal to or lower than the threshold voltage Vth (S22). When the CPU 82 determines that the driving voltage Vc is equal to or lower than the threshold voltage Vth (S22: YES), the CPU 82 fixes the steering correction amount θd to zero and fixes the target operation angle θa*, thereby stopping a process of varying the steering angle ratio (S24). The process of fixing the target operation angle θa* may be, for example, a process of assigning, to the target operation angle θa*, a value obtained by subtracting the steering angle θh at the time when an affirmative determination is made in S22 from the steered angle θp at the same time. The CPU 82 proceeds to S18 after the process in S24 is completed.

When the process in S18 is completed or when a negative determination is made in S10 or S22, the CPU 82 ends the series of processes illustrated in FIG. 3.

Next, the operation of the present embodiment will be described. When the clutch 42 is in the disengaged state, the CPU 82 controls the reaction-force actuator 20 to apply a reaction force that is a force acting against an operation of the steering wheel 12. When the CPU 82 detects a decrease in the voltage VU in this state, the CPU 82 stops generation of torque by the reaction-force motor 26 by opening the relay Rs. Even in this case, the CPU 82 calculates the steered angle command value θp* based on the steering torque Trqs, and outputs the steered angle command value θp* to the steered-side microcomputer 90. Then, the CPU 92 of the steered-side microcomputer 90 controls the torque to be generated by the steered-operation motor 70 such that the steered angle θp is caused to follow the steered angle command value θp* through feedback control. When this control is executed, a transmission state where power transmission between the steering wheel 12 and the steered wheels 53 is allowed is achieved. Thus, a reaction force from the steered wheel 53-side is transmitted to the steering wheel 12, and therefore a certain magnitude of force is required to turn the steering wheel 12. For this reason, it is possible to suppress the steering angle θh from being an excessively large value by applying a slight force to the steering wheel 12.

When the CPU 82 detects a decrease in the driving voltage Vc for the switching device 40, the CPU 82 stops the steering angle ratio variable process. The CPU 82 operates the reaction-force actuator 20 to generate a reaction force such that the steering angle θh follows the steering angle command value θh*, and, in accordance with this operation of the CPU 82, and the CPU 92 operates the steered-operation actuator 50 in order to adjust the steered angle θp to the steered angle command value θp*. During this control, an amount of change in the steering angle command value θh* and an amount of change in the steered angle command value θp* are each maintained at a constant value.

According to the present embodiment described above, the following advantageous effects are also obtained.

(1) When the driving voltage (the voltage VU) for the reaction-force actuator 20 is decreased, the current to be passed through the reaction-force actuator 20 is limited by stopping the generation of torque by the reaction-force actuator 20. This makes it possible to reduce the occurrence of an undesired state due to passage of a large current to the reaction-force actuator 20 despite a decrease in the driving voltage. Examples of the undesired state include a state where the amount of heat generation of the switching devices of the inverter 28 is excessively increased due to an excessive increase in the conduction resistance of the switching devices that is caused by a decrease in the voltage that is applied to a gate of each switching device in order to drive the inverter 28 by the pre-driver 30.

Next, a second embodiment will be described with reference to the drawings. The differences from the first embodiment will be mainly described below.

Figure 4:
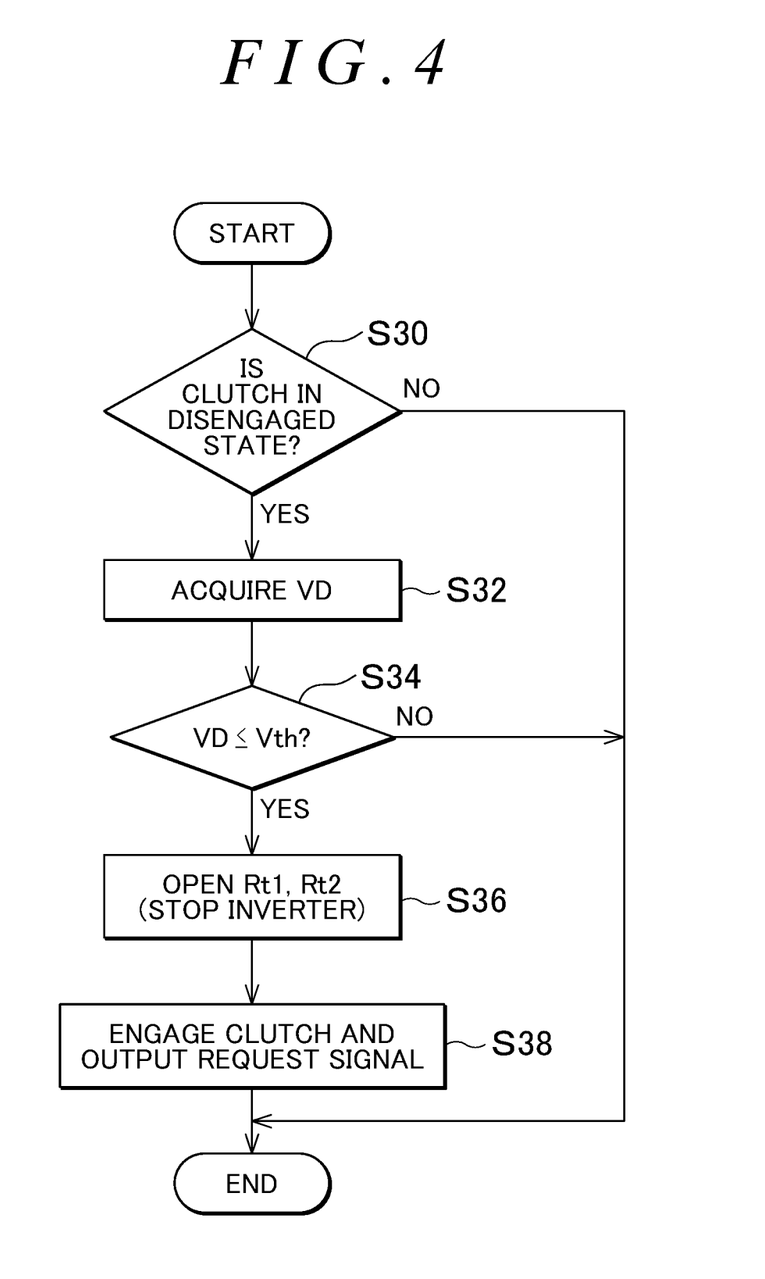
FIG. 4 is a flowchart illustrating the procedures of a process executed by a steered-side microcomputer according to a second embodiment.

The present embodiment is provided in order to cope with a decrease in the driving voltage for the steered-operation actuator 50. FIG. 4 illustrates the procedures of a process that is executed when the driving voltage for the steered-operation actuator 50 is abnormal. The process illustrated in FIG. 4 is achieved when the CPU 92 executes a program stored in the memory 94 at prescribed time intervals.

In a series of processes illustrated in FIG. 4, first, the CPU 92 determines whether the clutch 42 is in a disengaged state based on a result of communication with the reaction-force-side microcomputer 80 (S30). When the CPU 92 determines that the clutch 42 is in the disengaged state (S30: YES), the CPU 92 acquires a driving voltage VD for the steered-operation actuator 50 (S32). Then, the CPU 92 determines whether the driving voltage VD is equal to or lower than a threshold voltage Vth (S34). When the CPU 92 determines that the driving voltage VD is equal to or lower than the threshold voltage Vth (S34: YES), the CPU 92 opens the relays Rt1, Rt2 and stops the output of the operation signal MSt to the inverters 72, 76, thereby stopping the generation of torque by the steered-operation motor 70 (S36). Then, the CPU 92 outputs a request signal to the reaction-force-side microcomputer 80 to engage the clutch 42 (S38).

When the process in S38 is completed or when a negative determination is made in S30 or S34, the CPU 92 ends the series of processes illustrated in FIG. 4.

Next, the operation of the present embodiment will be described. When the clutch 42 is in a disengaged state, the CPU 92 operates the steered-operation actuator 50 such that the steered angle θp is caused to follow the steered angle command value θp* output from the reaction-force-side microcomputer 80 through feedback control. When the CPU 92 detects a decrease in the driving voltage VD for the steered-operation actuator 50, the CPU 92 stops the generation of torque by the steered-operation motor 70, for example, by opening the relays Rt1, Rt2. In addition, the CPU 92 issues, to the reaction-force-side microcomputer 80, a request to engage the clutch 42. Thus, the CPU 82 of the reaction-force-side microcomputer 80 switches the clutch 42 to an engaged state. In addition, the CPU 82 executes adjusts the torque to be generated by the reaction-force motor 26 to the reaction force command value Trqr* through the process illustrated in FIG. 2. In this case, the reaction force command value Trqr* is a value corresponding to the assist torque Trqa. Thus, when a user operates the steering wheel 12, the reaction-force motor 26 generates a torque for assisting an operation of the steering wheel 12. As a result, in response to an operation of the steering wheel 12, the steered wheels 53 are steered through cooperation between the steering torque Trqs and the torque generated by the reaction-force motor 26.

Next, a third embodiment will be described with reference to the drawings. The differences from the second embodiment will be mainly described below.

Figure 5:
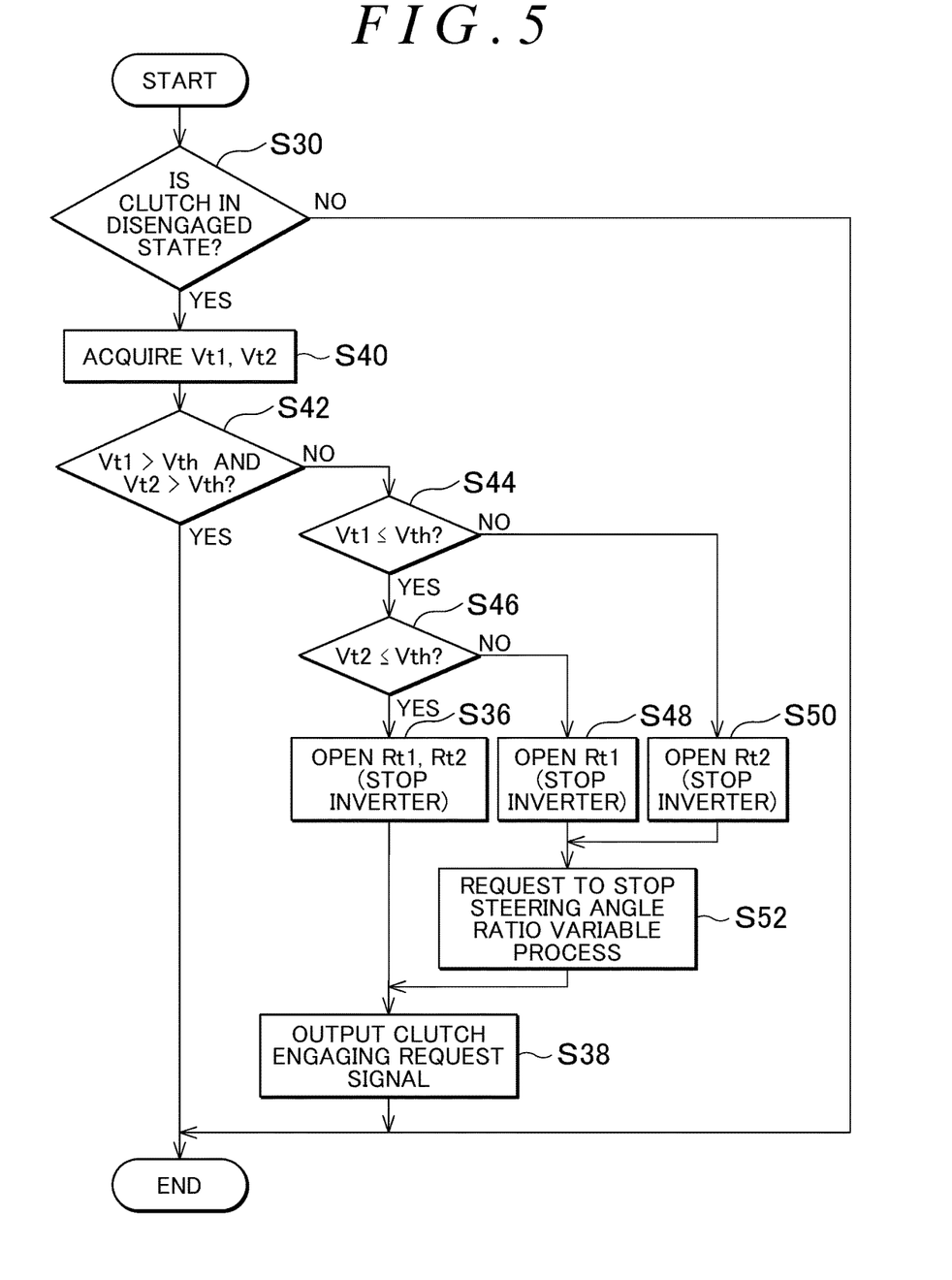
FIG. 5 is a flowchart illustrating the procedures of a process executed by a steered-side microcomputer according to a third embodiment.

FIG. 5 illustrates the procedures of a process that is executed when the driving voltage for the steered-operation actuator 50 is abnormal according to the present embodiment. The process illustrated in FIG. 5 is achieved when the CPU 92 executes a program stored in the memory 94 at prescribed time intervals. In the process illustrated in FIG. 5, the same steps as those in FIG. 4 will be denoted by the same step numbers and the detailed description thereof will be omitted, for the sake of convenience.

In a series of processes illustrated in FIG. 5, when the CPU 92 determines that the clutch 42 is in a disengaged state (S30: YES), the CPU 92 acquires a driving voltage Vt1 for the first system coil SC1 and a driving voltage Vt2 for the second system coil SC2 (S40). Then, the CPU 92 determines whether a logical conjunction of the following logical propositions i), ii) is true: i) the driving voltage Vt1 is higher than the threshold voltage Vth; and ii) the driving voltage Vt2 is higher than the threshold voltage Vth (S42). When the CPU 92 determines that the logical conjunction is false (S42: NO), the CPU 92 determines whether the driving voltage Vt1 is equal to or lower than the threshold voltage Vth (S44). When the CPU 92 determines that the driving voltage Vt1 is equal to or lower than the threshold voltage Vth (S44: YES), the CPU 92 determines whether the driving voltage Vt2 is equal to or lower than the threshold voltage Vth (S46). When the CPU 92 determines that the driving voltage Vt2 is equal to or lower than the threshold voltage Vth (S46: YES), the CPU 92 determines that both the driving voltage Vt1 for the first system coil SC1 and the driving voltage Vt2 for the second system coil SC2 have been decreased, and then executes the processes in S36 and S38.

On the other hand, when the CPU 92 determines that the driving voltage Vt2 is higher than the threshold voltage Vth (S46: NO), the CPU 92 opens the relay Rt1 and stops outputting the operation signal MSt to the inverter 72 (S48). This is a process of stopping the generation of torque through energization of the first system coil SC1, in view of the fact that only the driving voltage Vt1 for the first system coil SC1 has been decreased.

When the CPU 92 determines that the driving voltage Vt1 is higher than the threshold voltage Vth (S44: NO), the CPU 92 opens the relay Rt2 and stops outputting the operation signal MSt to the inverter 76 (S50). This is a process of stopping the generation of torque through energization of the second system coil SC2, in view of the fact that only the driving voltage Vt2 for the second system coil SC2 has been decreased.

When the process in S48 or S50 is completed, the CPU 92 outputs a request signal for stopping the steering angle ratio variable process to the reaction-force-side microcomputer 80 together with the present steered angle θp (S52). This is a process for causing the CPU 82 to execute the process in S24 in FIG. 3. When the process in S52 is completed, the CPU 92 returns to the process in S38.

Next, the operation of the present embodiment will be described. When only the driving voltage for the first system coil SC1, among the driving voltage for the first system coil SC1 and the driving voltage for the second system coil SC2, has been decreased, the CPU 92 stops the process of generating torque through energization of the first system coil SC1, for example, by opening the relay Rt1.

The CPU 92 issues, to the reaction-force-side microcomputer 80, a request to engage the clutch 42. Thus, the CPU 82 switches the clutch 42 to the engaged state. In addition, the CPU 92 outputs the steered angle θp to the reaction-force-side microcomputer 80, and issues a request to stop the steering angle ratio variable process. Thus, the CPU 82 outputs a value obtained by adding a difference between the steered angle θp and the steering angle θh at the time of engagement of the clutch 42 to the steering angle command value θh* calculated based on the steering torque Trqs at each time, to the CPU 92 as the steered angle command value θp*. The CPU 92 calculates the steered torque command value Trqt* as a manipulated variable used to cause the steered angle θp to follow the steered angle command value θp* through feedback control. Then, the CPU 92 operates the inverter 76 such that the steered torque command value Trqt* is achieved through only energization of the second system coil SC2.

Meanwhile, the CPU 82 executes control such that the torque generated by the reaction-force motor 26 follows the reaction force command value Trqr*. The torque generated by the reaction-force motor 26 may have the same sign as that of the torque generated by the steered-operation motor 70. In other words, the steered wheels 53 may be steered through an operation of the steering wheel 12 and cooperation between the reaction-force motor 26 and the steered-operation motor 70.

The correspondence relationship between the matters described in the foregoing embodiments and the matters described in claims is as follows.

1. The process in each of S12, S32 and S40 is an example of a driving voltage acquisition process, and the process executed by the CPU 82 or 92 according to the process in S18 in FIG. 3 or S38 in FIG. 4 or FIG. 5 is an example of a transmission operation process.

2. The process in each of S32 and S40 is an example of a steered-operation voltage acquisition process. The process in which the operation signal MSs is generated by the operation signal generation processing circuit M26 based on the reaction force command value Trqr* set based on the assist torque Trqa* and is output therefrom when the clutch 42 is engaged, is an example of a reaction force operation process.

3. The process in each of S36, S48 and S50 is an example of a steered-side limiting process.

4. The process in S36 is an example of a steered-side limiting process.

5. The process in S40 is an example of a steered-operation voltage acquisition process, and the process in each of S48 and S50 is an example of a steered-side limiting process.

6. The process in S20 is an example of a switching voltage acquisition process.

7. The process in S12 is an example of a reaction force voltage acquisition process, and the process in S16 is an example of a reaction-force-side limiting process.

8. The process executed by the assist torque setting processing circuit M6, the process executed by the addition processing circuit M8, the process executed by the reaction force setting processing circuit M10, the process executed by the deviation calculation processing circuit M12, and the process executed by the steering angle command value calculation processing circuit M20 indicate an example of a steering angle command value setting process. The process executed by the steering angle feedback processing circuit M22, the process executed by the addition processing circuit M24, and the process executed by the operation signal generation processing circuit M26 indicate a reaction force operation process. The process executed by the assist torque setting processing circuit M6, the process executed by the addition processing circuit M8, the process executed by the reaction force setting processing circuit M10, the process executed by the deviation calculation processing circuit M12, the process executed by the steering angle command value calculation processing circuit M20, the process executed by the steering angle ratio variable processing circuit M28, the process executed by the addition processing circuit M30, the process executed by the differential steering processing circuit M32, and the process executed by the steering correction processing circuit M34 indicate an example of a process executed by the steered angle command value setting processing circuit. The process executed by the steered angle feedback processing circuit M36 and the process executed by the operation signal generation processing circuit M38 indicate an example of a steered-operation process. The process executed by the steering angle ratio variable processing circuit M28 is an example of a variable setting process, and the process in S24 is an example of a stopping process.

Note that at least one of the matters of the foregoing embodiments may be modified as follows. The steering angle feedback processing circuit is not limited to the circuit configured to calculate the feedback torque Trqr1* as the sum of the output values from the proportional element, the integrating element, and the differentiating element based on an input of the value that is obtained by subtracting the steering angle θh from the steering angle command value θh*. For example, the steering angle feedback processing circuit may be a circuit configured to calculate the feedback torque Trqr1* as the sum of the output values from the proportional element and the differentiating element based on the input of the value that is obtained by subtracting the steering angle θh from the steering angle command value θh*.

In the reaction force operation process, it is not absolutely necessary to generate the operation signal MSs based on the manipulated variable (the feedback torque Trqr1*) of the steering angle feedback-control when the clutch 42 is engaged due to a low driving voltage for the steered-operation actuator 50. For example, open loop control in which the assist torque Trqa* is used as a torque command value for the reaction-force motor 26 may be executed. Further, the assist torque Trqa* corresponding to the steering torque Trqs may be adapted to different values when the clutch 42 is in the engaged state and in the disengaged state.

For example, when the steered-operation motor 70 also generates torque in the engaged state of the clutch 42, the following process may be executed. That is, a torque value that is determined based on the steering torque Trqs by the same process as the process executed by the assist torque setting processing circuit M6 may be divided into the reaction force command value Trqr* and the steered operation torque command value Trqt*. Note that, "dividing A into the reaction force command value Trqr* and the steered operation torque command value Trqt*" does not mean that the equation Trqr*+Trqt*=A holds true, but means the following. For example, if A is an amount having the magnitude of a torque of the rotary shaft 26a, the sum of the reaction force command value Trqr* and a value that is equivalent to the torque of the rotary shaft 26a and that is obtained by converting the steered operation torque command value Trqt* based on the rotation speed ratio between the rotary shaft 70a and the rotary shaft 26a is A.

While the reaction-force-side limiting process is achieved by opening the relay Rs in the foregoing embodiment, the reaction-force-side limiting process is not limited to this process. The reaction-force-side limiting process may be, for example, a process of outputting the operation signal MSs to the inverter 28 such that the d-axis current command value and the q-axis current command value for the reaction-force motor 26 are controlled to be zero. The reaction-force-side limiting process may be, for example, a process of setting an upper limit value of the current command value to a value that is smaller than a value at normal times when a driving voltage is not low and that is larger than zero. This process is particularly effective when both the driving voltage for the steered-operation actuator 50 and the driving voltage for the reaction-force actuator 20 have been decreased. That is, when both the current to be passed to the steered-operation motor 70 and the current to be passed to the reaction-force motor 26 are set to values larger than zero while being limited, it is possible to more reliably reduce the occurrence of a situation where the torque for assisting an operation of the steering wheel 12 becomes insufficient, than when the current to be passed to the reaction-force motor 26 is limited to zero.

The reaction force voltage acquisition process is not limited to the process of acquiring the voltage VU, and may be, for example, a process of acquiring the voltage Vs illustrated in FIG. 1. For example, when the relay Rs is a normally-open relay, the reaction force voltage acquisition process may be a process of acquiring a driving voltage of the relay Rs.

The steered angle feedback processing circuit is not limited to the circuit configured to calculate the manipulated variable for the steered-operation actuator 50 (steered operation torque command value Trqt*) as the sum of the output values from the proportional element, the integrating element, and the differentiating element based on the input of the value that is obtained by subtracting the steered angle θp from the steered angle command value θp*. For example, the steered angle feedback processing circuit may be a circuit configured to calculate the manipulated variable for the steered-operation actuator 50 as the sum of the output values from the proportional element and the differentiating element based on the input of the value that is obtained by subtracting the steered angle θp from the steered angle command value θp*.

The operation of steered-operation actuator will be described below. (a) Regarding the processes executed at normal times, it is not absolutely necessary to execute the process by the steering angle ratio variable processing circuit M28 and the process by the differential steering processing circuit M32.

(b) Regarding the processes executed when the driving voltage for the reaction-force actuator has been decreased, it is not absolutely necessary to generate the operation signal MSt based on the manipulated variable of the steered angle feedback-control when the process in S16 is executed in the process in FIG. 3. For example, the steered torque command value Trqt* may be set to a torque (a manipulated variable of the open loop control) determined based on the steering torque Trqs through the same process as the process executed by the assist torque setting processing circuit M6. Alternatively, for example, the sum of the manipulated variable of the feedback-control and the manipulated variable of the open loop control may be used as the steered torque command value Trqt*.

In a case where an affirmative determination is made in S14, when the torque generation process for the reaction-force motor 26 is not stopped as indicated in the above description about the reaction-force-side limiting process, the following process may be executed. That is, the torque determined based on the steering torque Trqs through the same process as the process executed by the assist torque setting processing circuit M6 may be divided into the reaction force command value Trqr* and the steered torque command value Trqt*.

The steered-operation voltage acquisition process is not limited to the processing of acquiring the driving voltages VD, Vt1, Vt2. For example, the steered-operation voltage acquisition process may be a process of acquiring a voltage when the pre-driver 74 turns on the switching devices of the inverter 72. This voltage can be detected as a higher one of the two voltage values output from the pre-driver 74. Alternatively, for example, the steered-operation voltage acquisition process may be a process of acquiring a voltage when the pre-driver 78 turns on the switching devices of the inverter 76. For example, when the relays Rt1, Rt2 are normally-open relays, the steered-operation voltage acquisition process may be a process of acquiring a driving voltage for the relays Rt1, Rt2. In this case, when the driving voltage has been decreased, it is desirable to stop the torque generation process for the steered-operation motor 70.

Regarding the steered-side limiting process, the process of limiting the current to be passed to the first system coil SC1 is the process of opening the relay Rt1 in the foregoing embodiment, but the steered-side limiting process is not limited to this process. For example, the steered-side limiting process may be a process of outputting the operation signal MSs to the inverter 72 such that the d-axis current command value and the q-axis current command value for the first system coil SC1 are controlled to be zero. Alternatively, the steered-side limiting process may be a process of setting an upper limit value of the current command value to a value that is smaller than a value at normal times when the driving voltage is not low and that is larger than zero.

The process of limiting the current to be passed to the second system coil SC2 is the process of opening the relay Rt2 in the foregoing embodiment, but may be another process. For example, this process may be a process of outputting the operation signal MSs to the inverter 76 such that the d-axis current command value and the q-axis current command value for the second system coil SC2 are controlled to be zero. Alternatively, this process may be a process of setting an upper limit value of the current command value to a value that is smaller than a value at normal times when the driving voltage is not low and that is larger than zero.

The switching voltage acquisition process is not limited to a process of acquiring the driving voltage Vc. For example, the switching voltage acquisition process may be a process of acquiring a voltage between the electromagnetic coil 44 and the clutch driver 46.

Regarding the process executed when the driving voltage for switching device has been decreased, when the clutch 42 is engaged due to a decrease in the driving voltage for the switching device 40, for example, only the steered-operation actuator 50 may be driven. This process can be achieved, for example, by opening the relay Rs and executing the process in FIG. 2 or by assigning the torque (a manipulated variable of the open loop control) determined based on the steering torque Trqs through the same process as the process executed by the assist torque setting processing circuit M6 to the steered torque command value Trqt*. Alternatively, only the reaction-force actuator 20 may be driven. This process can be achieved by opening the relays Rt1, Rt2 and executing the process illustrated in FIG. 2 or by using the manipulated variable of the open loop control indicated in the above description about the reaction force operation processing as the reaction force command value Trqr*.

Regarding the stopping process, for example, when the process to be executed by the steering angle ratio variable processing circuit M28 is not programmed in a memory and the process to be executed by the differential steering processing circuit M32 is programmed in a memory, the process by the differential steering processing circuit M32 may be stopped after the clutch 42 is engaged. For example, when the process to be executed by the differential steering processing circuit M32 is not programmed in a memory and the process to be executed by the steering angle ratio variable processing circuit M28 is programmed in a memory, the steering angle ratio variable setting process by the steering angle ratio variable processing circuit M28 may be stopped after the clutch 42 is engaged. However, in any case where the feedback process for the steered angle θp and the feedback process for the steering angle θh are executed in combination when the clutch 42 is in the engaged state, a difference between the steered angle command value θp* and the steering angle command value θh* is preferably a value obtained by subtracting the steering angle θh from the steered angle θp at the time when the clutch 42 is engaged.

As for the setting of the steered angle command value and the steering angle command value, instead of the process illustrated in FIG. 2, for example, a steered angle command value calculation processing circuit may be provided. The steered angle command value calculation processing circuit calculates the steered angle command value θp* based on a value output from the deviation calculation processing circuit M12 through the same process as the process executed by the steering angle command value calculation processing circuit M20. In this case, a value obtained by subtracting the target operation angle θa* from the steered angle command value θp* may be used as the steering angle command value θh*.

The steering angle command value calculation processing circuit M20 may set the steering angle command value θh* according to a model equation expressed by Equation (c2), instead of the model equation expressed by Equation (c1).

$$\Delta = K \cdot \theta h^* + C \cdot \theta h^{*\prime} + J \cdot \theta h^{*\prime\prime}$$ Equation (c2)

Here, a spring constant K is obtained by modeling an influence of the vehicle, and is determined based on the specifications of the suspension, wheel alignment, and so forth. In the foregoing modified example in which the steered angle command value θp* is set based on the model without using the steering angle command value θh*, the steering angle command value θh* in Equations (c1), (c2) are replaced with the steered angle command value θp*.

Regarding the measurement unit of the steered angle and the steering angle, the process by the measurement unit setting processing circuit M4 is not absolutely necessary. In other words, it is not absolutely necessary to convert both the steered angle θp and the steering angle θh into rotation amounts of the steering wheel 12 when the clutch 42 is in the engaged state. Even if such a process is not executed, when the clutch 42 is in the disengaged state, as the target operation angle θa* is sequentially set by the steering angle ratio variable processing circuit M28, the steered angle θp is caused to follow the steered angle command value θp* through feedback control. In this case, the target operation angle θa* may be variably set even when the steering angle ratio is fixed. When the clutch 42 is in the engaged state, if only one of the steered-operation actuator 50 and the reaction-force actuator 20 is driven, there is not a problem that would be caused if the units of the steered angle θp and the steering angle θh are not set as described above.

Regarding the steered-operation actuator, the steered-operation motor 70 includes the first system coil SC1, the second system coil SC2, and a single rotor in the foregoing embodiment, but the steered-operation actuator is not limited to this. For example, the steered-operation actuator may include a rotor for the first system coil SC1 and a rotor for the second system coil SC2 that are prepared separately. When the steered-operation motor 70 has a redundant configuration, the redundant configuration is not limited to a dual-redundant configuration and may be, for example, a triple-redundant configuration. Further, the steering motor 79 need not have a redundant configuration.

The steered-operation motor 70 is not limited to an SPMSM, and may instead be an IPMSM. The steered-operation motor 70 is not limited to a synchronous motor, and may instead be an induction motor, for example. The steered-operation actuator 50 is not limited to a rack-and-pinion actuator. The steered-operation actuator 50 may be, for example, a Rack-cross (R) type actuator, a Rack-parallel (R) type actuator, or a rack coaxial type actuator.

Regarding the steering controller, the microcomputer (the reaction-force-side microcomputer 80) configured to operate the reaction-force actuator 20 and the clutch driver 46 and the steered-side microcomputer 90 configured to operate the steered-operation actuator 50 are different microcomputers in the foregoing embodiment. However, another configuration may be employed. For example, these microcomputers may be integrated into a single microcomputer. For example, the microcomputer configured to operate the reaction-force actuator 20, the microcomputer configured to operate the clutch driver 46, and the steered-side microcomputer 90 configured to operate the steered-operation actuator 50 may be microcomputers different from each other.

The steering controller is not limited to the controller that includes the CPUs 82, 92 and the memories 84, 94 and executes software processes. For example, the steering controller may include a dedicated hardware circuit (e.g., ASIC) that executes at least some of the processes that are executed by software in the foregoing embodiments. Specifically, the steering controller may have any one of the following configurations (a) to (c): (a) a configuration including a processing device that executes all the processes according to programs, and a memory storing these programs; (b) a configuration including a processing device that executes some of the processes according to the programs, a memory storing these program, and a dedicated hardware circuit that executes the remaining processes; and (c) a configuration including a dedicated hardware circuit that executes all the processes.

The reaction-force motor 26 is not limited to an SPMSM, and may instead be an IPMSM. The reaction-force motor 26 is not limited to a synchronous motor, and may instead be an induction motor, for example.

What is claimed is:

1. A steering controller configured to control a steering system including (i) a switching device configured to perform switching between a transmission state where power transmission from a steering wheel to steered wheels is allowed and an interruption state where power transmission from the steering wheel to the steered wheels is interrupted, (ii) a reaction-force actuator configured to apply a steering reaction force to the steering wheel in the interruption state, and (iii) a steered-operation actuator configured to steer the steered wheels, the steering controller comprising:
   a memory configured to store software for controlling the steering system; and
   a hardware device configured to control the steering system by executing the software, wherein
   the switching device is placed in the interruption state upon energization, and is placed in the transmission state when entering a de-energized state, and
   the steering controller executes
      a voltage acquisition process of, when the switching device is in the interruption state, acquiring an acquired driving voltage, the acquired driving voltage being one of a driving voltage for the reaction-force actuator, a driving voltage for the steered-operation actuator, and a driving voltage for the switching device, and
      a transmission operation process of placing the switching device in the transmission state when the acquired driving voltage acquired through the voltage acquisition process is equal to or lower than a threshold voltage.

2. The steering controller according to claim 1, wherein
   the voltage acquisition process is a steered-operation voltage acquisition process of acquiring the driving voltage for the steered-operation actuator, and
   the steering controller executes a reaction force operation process of operating the reaction-force actuator to cause the reaction-force actuator to generate a torque for steering the steered wheels when the transmission operation process is executed.

3. The steering controller according to claim 2, wherein, when the transmission operation process is executed, a steered-side limiting process is executed, the steered-side limiting process being a process of limiting a current passed to an electric motor incorporated in the steered-operation actuator to a value smaller than a value when the transmission operation process is not executed.

4. The steering controller according to claim 3, wherein the steered-side limiting process is a process of preventing the steered-operation actuator from generating a torque for steering the steered wheels when the transmission operation process is executed.

5. The steering controller according to claim 1, wherein
   an electric motor incorporated in the steered-operation actuator includes at least a first system coil and a second system coil serving as stator coils and insulated from each other,
   the voltage acquisition process is a steered-operation voltage acquisition process of acquiring a driving voltage for the first system coil serving as the driving voltage for the steered-operation actuator and a driving voltage for the second system coil serving as the driving voltage for the steered-operation actuator, and
   the steering controller executes,
      when the driving voltage for one of the first system coil and the second system coil is equal to or lower than a threshold voltage and the driving voltage for the other one of the first system coil and the second system coil is higher than the threshold voltage, a steered-side limiting process of generating a torque for steering the steered wheels using the steered-operation actuator by passing a current to the other one of the first system coil and the second system coil without passing a current to the one of the first system coil and the second system coil, and
      a process of generating a torque for steering the steered wheels using the steered-operation actuator by passing a current to both the first system coil and the second system coil, on a condition that the driving voltages for the first system coil and the second system coil are higher than the threshold voltage.

6. The steering controller according to claim 1, wherein the voltage acquisition process is a switching voltage acquisition process of acquiring the driving voltage for the switching device.

7. The steering controller according to claim 1, wherein
   the voltage acquisition process is a reaction force voltage acquisition process of acquiring the driving voltage for the reaction-force actuator, and
   when the transmission operation process is executed, the steering controller executes a reaction-force-side limiting process of limiting a current passed to an electric motor incorporated in the reaction-force actuator to a value smaller than a value when the transmission operation process is not executed.

8. The steering controller according to claim 2, wherein the steering controller executes a steering angle command value setting process of setting a steering angle command value based on an operation of the steering wheel, a reaction force operation process of operating the reaction-force actuator such that a steering angle follows the steering angle command value through feedback control, a steered angle command value setting process of setting a steered angle command value based on an operation of the steering wheel, a steered-operation process of operating the steered-operation actuator such that a steered angle follows the steered angle command value through feedback control, a variable setting process of variably setting a command value of a steering angle ratio that is a ratio between the steered angle command value and the steering angle command value when the switching device is in the interruption state, and a stopping process of stopping variable setting of the steering angle ratio that is the ratio between the steered angle command value and the steering angle command value, on a condition that the switching device is switched to the transmission state through the transmission operation process.

* * * * *